Oct. 27, 1925.
I. J. BARNES
1,558,774
BERRY PICKER
Filed Sept. 17, 1923
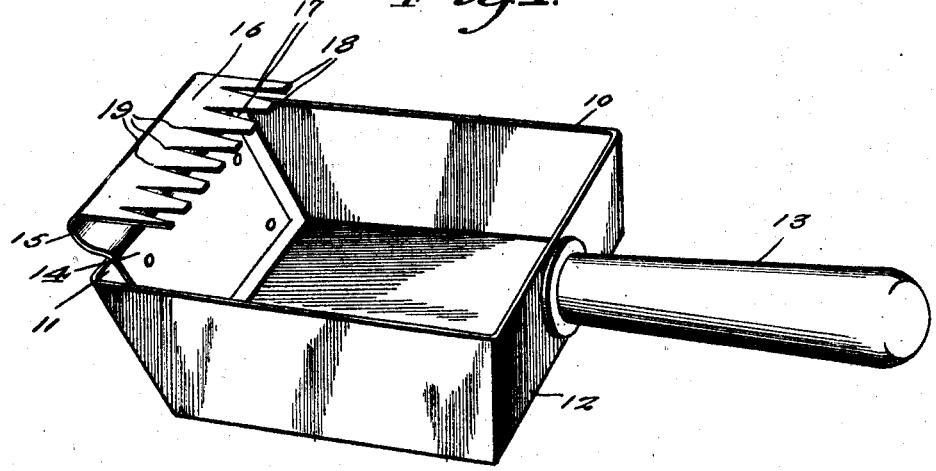
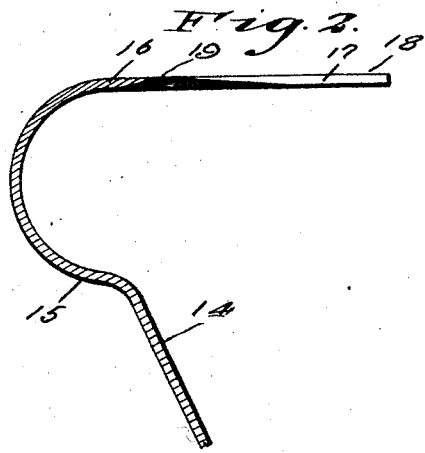
Ira J. Barnes INVENTOR Patented Oct. 27, 1925.

1,558,774

UNITED STATES PATENT OFFICE.

IRA J. BARNES, OF QUEEN CITY, MISSOURI.

BERRY PICKER.

Application filed September 17, 1923. Serial No. 663,238.

*To all whom it may concern:*

Be it known that I, IRA J. BARNES, a citizen of the United States, residing at Queen City, in the county of Schuyler and State of Missouri, have invented new and useful Improvements in Berry Pickers, of which the following is a specification.

This invention relates to harvesting devices, particularly to devices for gathering berries and the like, and has for its object the provision of a novel tool designed for use in picking goose berries and the like, currants and in fact all similar products having slender stems.

An important and more specific object is the provision of a device of this character which is constructed to resemble a scoop and which will consequently hold the berries after they are severed from their stems, the device furthermore having a handle which will permit it to be manipulated if care is exercised in such a way that the berries may be picked far more rapidly than is possible under the old method and without danger of the operator being scratched by the thorns.

An additional object is the provision of a device of this character which will be simple and inexpensive in manufacture, efficient and durable in use and a general improvement in the art.

With the above and other objects and advantages in view the invention consists in the details of construction to be hereinafter more fully described and claimed and illustrated in the accompanying drawings, in which:

Figure 1 is a perspective view of the device,

Figure 2 is an enlarged detail section through the blade.

Referring more particularly to the drawings I have shown my device as comprising a scoop shaped body 10 which may be constructed of wood if desired, but which is preferably formed as a stamping of suitable sheet metal. The major portion of this scoop is rectangular though one end is inclined as shown at 11. The opposite end 12 is equipped with a suitable handle 13 secured thereto by any desired means and in actual practice the handle might be constructed of wood, though if desired it could be formed of metal and even be made integral with the scoop.

Secured in any desired manner upon the inside of the inclined end 11 is the blade 14 which is formed from a single strip or plate of suitable metal reflexly bent as at 15 to define an overlying free end portion 16 located some distance above the open top of the scoop body. This free edge of the blade is formed with a plurality of elongated V-shaped notches 17 which define teeth 18, and the narrow ends of the slots are keenly sharpened to define cutting edges 19, the extremities of the teeth being blunt whereby to avoid injury to the operator and to avoid damage to the fruits or other articles being picked.

In the operation it is intended that the operator employ one hand for holding the branch or stalk to be stripped, and that he take the device in the other hand and manipulate it in such a manner that the berries, currants or the like will be disposed beneath the free end 16 of the blade, with the stems passing through the slots 17. The device is then pulled to apply strain upon the berries and the cutting edges 19 will of course operate to sever the stems so that the berries will drop into the scoop. When any desired amount has accumulated within the scoop it is a simple matter to invert it over a receptacle to effect dumping. In actual practice the device strips the berries from the bushes in a very rapid manner and without likelihood of mashing the berries as often occurs when they are picked manually. Furthermore by exercising ordinary care the operator may spare himself the discomfort of scratching his hands on the thorns.

While I have shown and described the preferred embodiment of my invention it is of course to be understood that I reserve the right to make such changes in the form, construction and arrangement of parts as will not depart from the spirit of the invention or the scope of the subjoined claims.

Having thus described my invention I claim:

1. A device of the character described comprising an open topped scoop, a handle at one end thereof, and a blade mounted on the other end, said blade having a curved portion overlying the scoop, the edge of said overlying curved portion being formed with a plurality of V-shaped notches defining teeth, the ends of said teeth being blunt and the side edges of the teeth being sharpened to a knife edge whereby stems engaged between the teeth will be severed by said edges.

2. A device of the character described comprising an open topped scoop having one end inclined, a handle secured upon the other end, and a blade of angular and curved shape having one portion conforming to and secured upon the inclined end of the scoop, the blade having its intermediate portion curved whereby its other end will overhang the scoop in substantially parallel relation to the bottom thereof and in a plane beyond the open top, said end of the blade being formed with a series of V-shaped notches defining teeth, the ends of the teeth being blunt and the side edges thereof being sharpened to define cutting edges.

3. A berry picker comprising an open topped scoop having one end arranged at right angles to its bottom and carrying a short handle, the other end being inclined with respect to the bottom and extending away from the handle, and a blade secured upon said inclined end and formed from a single piece of sheet metal including an attaching portion and a reflexly extended portion overlying the scoop at the inclined end thereof, said overlying end of the blade being formed with a plurality of teeth having blunt ends and sharp edges.

In testimony whereof I affix my signature.

IRA J. BARNES.